United States Patent [19]

Mabee et al.

[11] Patent Number: 4,831,985

[45] Date of Patent: May 23, 1989

[54] THROTTLE CONTROL SYSTEM

[76] Inventors: Brian D. Mabee, 26340 Woodingham, Warren, Mich. 48091; Keith V. Leigh-Monstevens, 5622 Larkins Dr., Troy, Mich. 48098

[21] Appl. No.: 156,850

[22] Filed: Feb. 17, 1988

[51] Int. Cl.[4] ........ F02D 41/04; B60K 41/28

[52] U.S. Cl. ........ 123/399; 123/395; 123/361; 192/0.052

[58] Field of Search ........ 123/399, 395, 361; 192/0.052

[56] References Cited

U.S. PATENT DOCUMENTS

| | | | |
|---|---|---|---|
| 4,413,714 | 11/1983 | Windsor | 192/0.033 |
| 4,418,810 | 12/1983 | Windsor | 192/0.076 |
| 4,432,445 | 2/1984 | Windsor | 192/0.076 |
| 4,497,397 | 2/1985 | Windsor et al. | 192/0.076 |
| 4,518,064 | 5/1985 | Windsor | 192/3.58 |
| 4,561,530 | 12/1985 | Parsons et al. | 192/0.076 |
| 4,601,271 | 7/1986 | Ejiri et al. | 123/399 |
| 4,638,898 | 1/1987 | Braun | 192/0.052 |
| 4,660,520 | 4/1987 | Inoue et al. | 123/399 |
| 4,677,880 | 7/1987 | Hattori et al. | 74/866 |
| 4,691,677 | 9/1987 | Hotate et al. | 123/399 |
| 4,698,535 | 10/1987 | Shiraki et al. | 123/337 |
| 4,718,380 | 1/1988 | Katayaga et al. | 123/399 |
| 4,727,838 | 3/1988 | Oshiage et al. | 123/399 |
| 4,727,840 | 3/1988 | Nishida et al. | 123/399 |
| 4,735,183 | 4/1988 | Inoue et al. | 123/399 |
| 4,747,380 | 5/1988 | Ejiri et al. | 123/399 |

OTHER PUBLICATIONS

SAE Technical Paper #860477/Robert G. Sokalski et al.
SAE Technical Paper #850173/Michael E. Moncelle et al.
SAE Technical Paper #840448/Manfred Schwab et al.
SAE Technical Paper #880407/Roger F. Wells et al.
Ledex Catalog #SS-1104.
Automotive Enginner, 8/1987.
Automotive Products Catalog, 8/1987.

*Primary Examiner*—Raymond A. Nelli
*Attorney, Agent, or Firm*—Krass & Young

[57] ABSTRACT

A throttle control system for a vehicle of the type including a throttle body and a throttle valve mounted within the throttle body and controlling the delivery of fuel and/or air to the engine of the vehicle. The invention control sytsem includes a rotary potentiometer providing an output signal representing the instantaneous position of the accelerator pedal of the vehicle; another rotary potentiometer providing an output signal representing the instantaneous angular position of the throttle valve; a comparator receiving the throttle pedal and throttle valve position signals and generating an error signal representing the difference between the two signals; a differential signal representing the rate of change in the error signal; a summer receiving the output signal from the throttle valve potentiometer, the error signal from the comparator, and the differential signal from the differential and generating a summed output signal; and a proportional rotary solenoid which receives the summed output signal from the summer and positions the pivot shaft of the throttle valve in proportion to the received signal.

12 Claims, 2 Drawing Sheets

FIG. 1
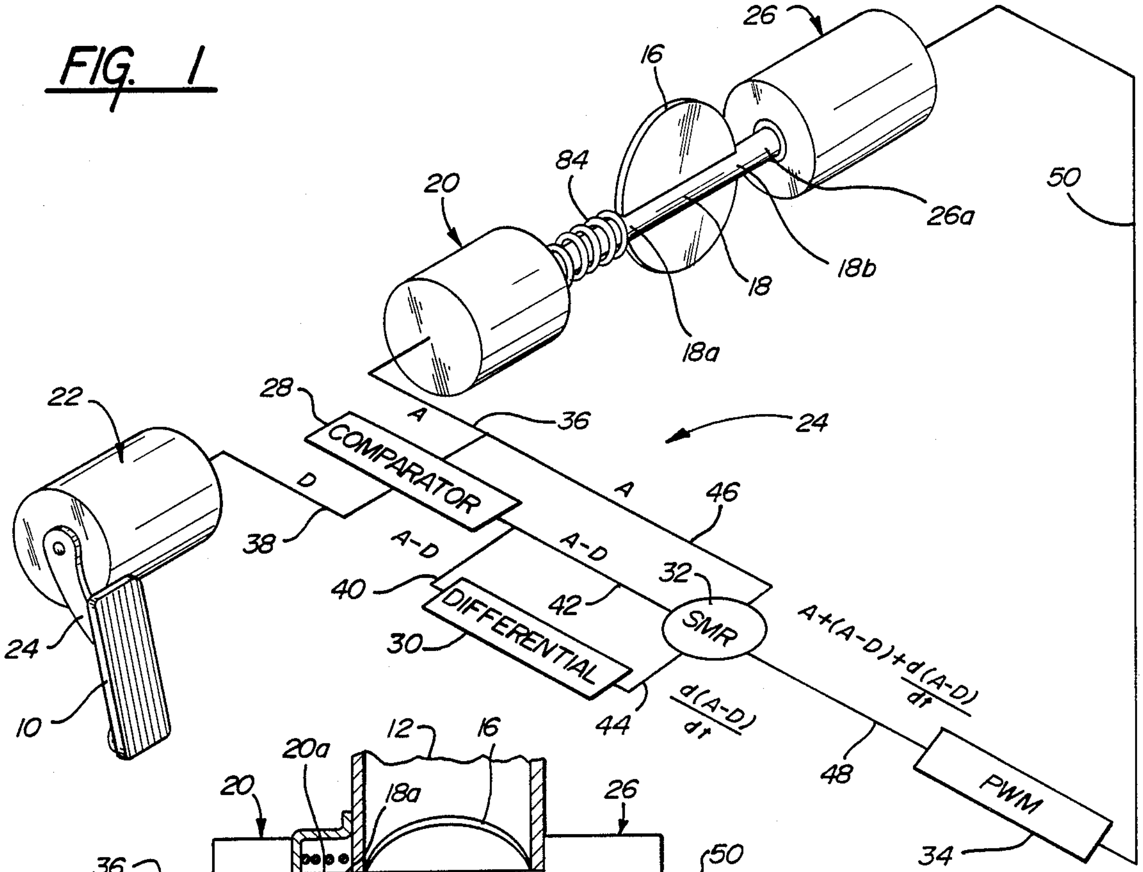
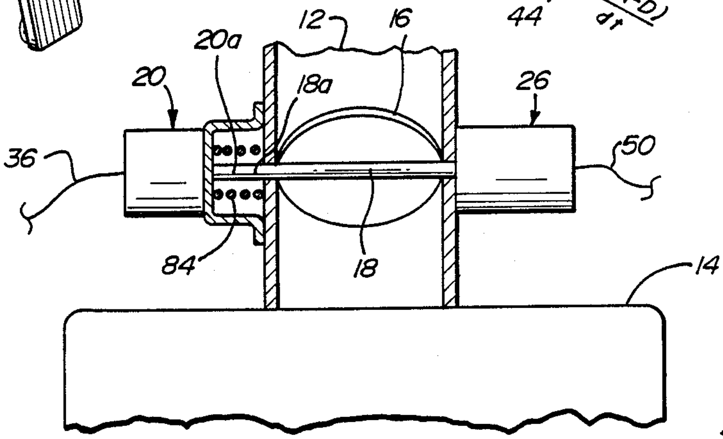
FIG. 2
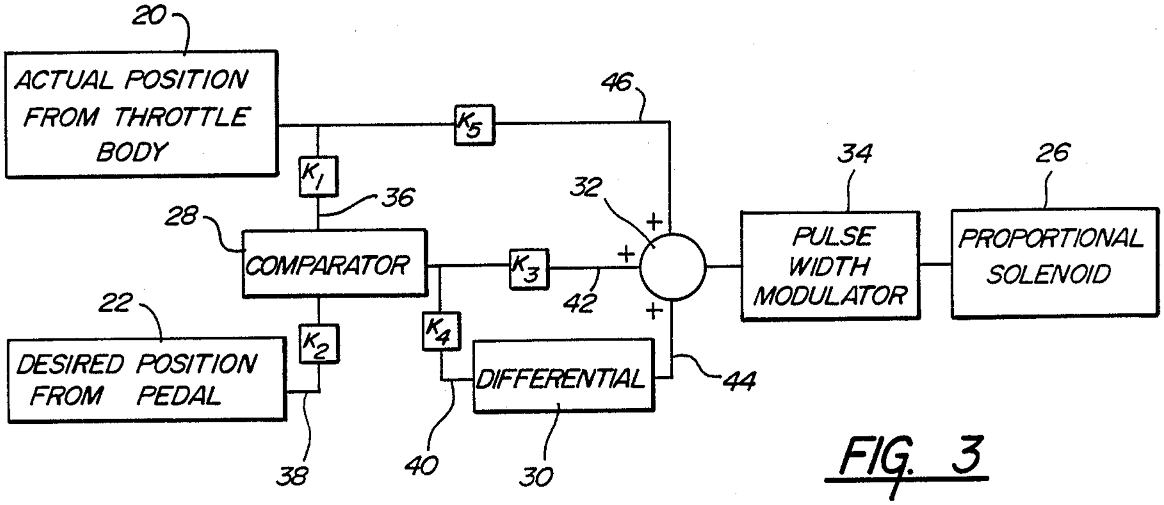
FIG. 3

THROTTLE CONTROL SYSTEM

BACKGROUND OF THE INVENTION

This invention relates to throttle control systems for motor vehicles and more particularly to an electronic throttle control system.

Conventionally, throttle control systems for motor vehicles have consisted of a throttle pedal connected to a cable which in turn is connected to the throttle body of the engine so as to control the throttle valve mounted within the throttle body and thereby control the delivery of the fuel/air mixture to the engine. Whereas cable controlled throttle control systems are generally satisfactory and have seen widespread application, they present problems in the context of the increasingly crowded underhood environment of a modern day motor vehicle. Specifically, the cables must circuitously routed from the accelerator pedal to the throttle body and the resulting circuitous configuration of the cable creates large amounts of friction within the cable assembly and thereby renders the cable assembly relatively inefficient. The prior art cable systems have also often failed to provide the required sensitivity as between movement of the throttle pedal and the desired movement of the throttle valve of the throttle body.

In an effort to avoid the disadvantages of the cable system, electronic systems have been developed to transmit the signal from the accelerator pedal to the throttle valve. However, the prior art electronic control systems have failed to provide a smooth control signal but rather have provided an oscillating control signal which has had the effect of inducing shock loading and damage to the transmission and other drivetrain components.

SUMMARY OF THE INVENTION

This invention is directed to the provision of an improved throttle control system for a motor vehicle.

More specifically, this invention is directed to the provision of an electronic throttle control system for a motor vehicle in which the control signal provides an extremely fast response as between the accelerator pedal and the throttle valve and in which the control signal is smooth so as to avoid undue loading to the drivetrain component.

The throttle control system of the invention is intended for use with a motor vehicle of the type including an engine, a throttle body including a throttle valve, and an operator controlled accelerator member. The invention control system includes throttle valve position sensing means operative to generate a first electrical signal representing the position of the throttle valve; accelerator position sensing means operative to generate a second electrical signal representing the position of the accelerator pedal; control means operative to generate a control signal reflecting the rate of change of the difference between the first and second signals; and actuator means receiving the control signal and operative to position the throttle valve in proportion to the control signal. This arrangement, whereby the throttle valve actuator responds to a control signal which reflects the rate of change of the difference between the throttle valve position signal and the accelerator pedal position signal, eliminates the problems with the prior art electronic control systems and, specifically, provides a control signal for the throttle valve actuator which is essentially without oscillations and which allows smooth and extremely fast response as between the throttle pedal and the throttle valve.

According to a further feature of the invention, the control signal provided to the throttle valve actuator includes a first component representing the rate of change of the difference between the throttle valve position signal and the accelerator pedal position signal and a second component signal representing the difference between the throttle valve position signal and the accelerator pedal position signal. This arrangement allows the invention control system to act as a dampening system by progressively slowing the rate at which the throttle valve position approaches the accelerator pedal position.

According to a further feature of the invention, the control signal further includes a third component representing the throttle valve position signal. This arrangement ensures that a control signal is provided to the throttle valve actuator even under steady state conditions when the accelerator pedal position signal equals the throttle valve position signal.

According to a further feature of the invention, the control means includes a comparator receiving the throttle valve and accelerator pedal position signals and generating an error signal representing the difference between these two signals and a differentiator receiving the error signal and generating a differential signal representing the rate of change of the error signal. This arrangement provides a convenient and efficient means of providing the desired differential signal representing the rate of change of the error signal.

According to a further feature of the invention, the control means further includes a summer, and the summer receives the throttle valve signal, the error signal, and the differential signal and generates a control signal having a first component representing the throttle valve signal, a second component representing the error signal, and a third component representing the differential signal. This arrangement provides a ready and efficient means of providing the desired composite control signal.

According to a further feature of the invention, the actuator controlling the throttle valve comprises a proportional solenoid. The use of a proportional solenoid provides very quick response to receipt of the control signal so as to further optimize the speed and efficiency of the invention control system.

According to a further feature of the invention, the throttle valve position sensing means and the accelerator position sensing means each comprise a rotary potentiometer. This arrangement allows the use of readily available electronic componentry so as to minimize the cost of the invention control system while retaining the effectiveness of the system.

According to a further feature of the invention, the throttle valve is positioned in a throttle body for pivotal movement on a throttle valve shaft, the rotary potentiometer providing the throttle valve position sensing means is secured to one end of the throttle valve shaft, and the rotary proportional solenoid providing the actuator for the throttle valve is secured to the other end of the throttle valve shaft. This arrangement provides a compact and efficient package for providing the throttle valve position sensing means and the throttle valve actuator.

BRIEF DESCRIPTION OF THE DRAWING

FIG. 1 is a diagrammatic, schematic view of a vehicular throttle control system according to the invention;

FIG. 2 is a fragmentary view of the throttle body of the engine of the associated vehicle;

FIG. 3 is a schematic view of a modified form of throttle control system according to the invention.

DETAILED DESCRIPTION OF THE PREFERRED EMBODIMENT

Figure 4:
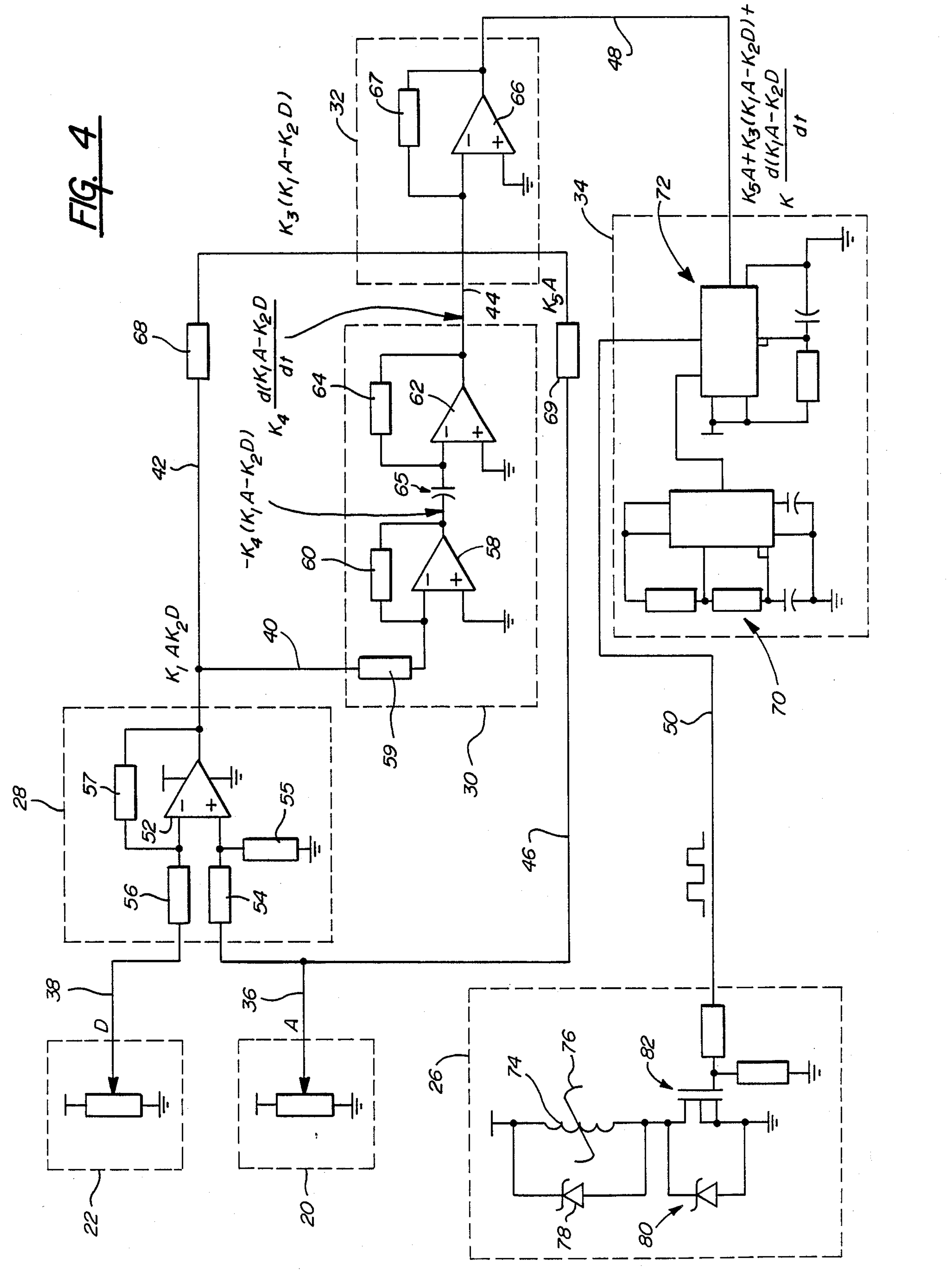
FIG. 4 is a circuit diagram of the throttle control system of FIG. 3.

The invention throttle control system is intended for use with a motor vehicle of the type including an operator controlled throttle pedal 10, a throttle body 12 associated with an engine 14, and a throttle valve 16 mounted within throttle body 12 for pivotal movement about a pivot shaft 18 so as to selectively control the delivery of air and/or fuel to the engine 14 in known manner.

The invention throttle control system, broadly considered, includes a throttle valve position sensing means 20; an accelerator pedal position sensing means 22; control means 24; and a throttle valve actuator 26.

Throttle position sensing means 20 preferably comprises a rotary potentiometer mounted on one side of throttle body 12 and having its output shaft 20*a* drivingly coupled to one end 18*a* of throttle valve pivot shaft 18 so that the potentiometer, in known manner, continuously tracks the angular position of throttle valve 16 so as to continuously generate an electrical signal that is proportioned to the angular position of the throttle valve. Rotary potentiometer 20 may, for example, comprise a unit available from Ford Motor Company as Motor Craft CX1013-E5AZ-9B989-A.

Accelerator position sensing means 22 also preferably comprises a rotary potentiometer and may be identical to rotary potentiometer 20. Potentiometer 22 includes a crank arm 24 secured to the output shaft of the potentiometer engaging the underside of the upper end of accelerator pedal 10 so that movement of accelerator pedal 10 by the operator moves crank arm 24 angularly so that potentiometer 22, in known manner, generates a control signal proportional to the angular position of the throttle pedal.

Control means 24 includes a comparator 28; a differential 30; a summer 32; and a pulse width modulator 34.

The throttle valve position signal is transmitted to comparator 28 from potentiometer 20 by a lead 36 and the accelerator position signal from potentiometer 22 is transmitted to comparator 28 by a lead 38 so that a signal A representing the actual position of the throttle valve 16 is constantly fed to comparator 28 via lead 36 and a signal D representing the desired position of the throttle valve as called for by accelerator 10 is constantly transmitted to comparator 28 via lead 38. Comparator 28 functions in known manner to generate a difference or error signal A−D which is then delivered to differential 30 by a lead and to summer 32 by a lead 42.

Differential 30 receives error signal A−D and, in known manner, generates a differential signal $$\frac{d(A-D)}{dt}$$

which is transmitted to summer 32 via line 44. Summer 32 also receives signal A, representing the instantaneous position of the throttle valve 16 via lead 46 so that summer 32 is at all times receiving and processing an actual throttle signal A via lead 46, an error signal A−D via lead 42, and a differential signal $$\frac{d(A-D)}{dt}$$

via lead 44. Summer 32 combines the three received signals to provided and output voltage signal $$A+(A-D)+\frac{d(A-D)}{dt}$$

which is fed via line 48 to pulse width modulator 34. The output signal of summer 32 is received by the control voltage input to the pulse width modulator 34 which delivers an output pulse width modulated signal to actuator 26 via a lead 50.

Actuator 26 preferably comprises a rotary proportional solenoid having its output shaft 26*a* drivingly and directly coupled to the other end 18*b* of pivot shaft 18 with the main body of the actuator mounted on the throttle body 12 in opposition to rotary potentiometer 20. Rotary proportional solenoid 26 may, for example, comprise a unit available from Ledex, Inc., of Vandalia, Ohio as Rotary Proportional Solenoid Part No. 187477-001.

The control system of the invention may also, where desired, include one or more weighting factors for controlling the magnitude of the signals A and D and the difference therebetween. A control system according to the invention employing weighting factors is shown schematically in FIG. 3 wherein a weighting factor K1 is employed in lead 36, a weighting factor K2 is employed in lead 38, a weighting factor K3 is employed in lead 42, a weighting factor K4 is employed in lead 40, and a weighting factor K5 is employed in lead 46.

Any one or more of the weighting factors may be unity. Inclusion of weighting factors in the magnitude of either or both signals A and D and/or the difference therebetween can be used to advantage by providing adjustment to the weight to the differential position of the function signal. Any one of the factors K1-K5 can of course be adjusted to provide unity or be eliminated completely where suitable or additional weighting factors may be included in the function signal where desired.

FIG. 4 is a circuit diagram of a control system according to the invention where weighting factors have been included. Comparator 28 in the system of FIG. 4 includes an operational amplifier 52 and resistances 54, 55, 56 and 57. Comparator 28 receives signals A and D and generates an output signal $K_1A-K_2D$ with weighting factor K1 equal to $$\frac{\text{Resistance 55}}{\text{Resistance 54} + \text{Resistance 55}}$$

and weighing factor K2 equal to $$\frac{\text{Resistance 57}}{\text{Resistance 56}}$$

Differential 30 in the system of FIG. 4 includes a first operational amplifier 58 coacting with resistances 59 and 60 to generate an output signal $-K_4(K_1A-K_2D)$ with weighting factor K4 equal to $$\frac{\text{Resistance } 60}{\text{Resistance } 59}.$$

Output signal $-K_4(K_1A-K_2D)$ is delivered to a second operational amplifier 62 coacting with a resistance 64 and a capacitor 65 to generate an output signal $$K_4\frac{D(K_1A-K_2D)}{dt}$$

for delivery to summer 32 via lead 44. Summer 32 includes an operational amplifier 66 and a Resistance 67. Summer 32 also receives a signal $K_3(K_1A-K_2D)$ from lead 42 via a Resistance 68 with weighting factor $K_3$ equal to $$\frac{\text{Resistance } 67}{\text{Resistance } 68}.$$

Summer 32 further receives a signal $K_5A$ from lead 46 via a Resistance 69 with weighting factor $K_5$ equal to $$\frac{\text{Resistance } 67}{\text{Resistance } 69}.$$

Summer 32 generates an output signal $$K_5A + K_3(K_1A - K_2D) + K_4\frac{d(K_1A - K_2D)}{dt}$$

which is delievered to pulse width modulator 34 via lead 48.

Pulse width modulator 34 includes two 555 timers 70 and 72. Timer 70 is a clock which creates a clock signal of, for example, 500 pulses per second, to trigger timer 555 which turns on and off for respective ratios of time varying in proportion to the voltage received at the input pin of timer 72. The output signal from pulse width modulator 3 is delivered via lead 50 to rotary proportional solenoid 26. Rotary proportional solenoid 26 includes a coil 80 and an armature 82. A field effect transistor 74 provides the transition between low current and high current logic. Field effect transistor 74 functions to switch coil 80 on and off in response to the output of timer 72 via lead 50 and thereby selectively rotate armature 82. A diode 76 and a suppressor 78 function to eliminate electronic noise and prevent damage to the coil or circuitry.

By using pulse width modulation in the electronics of rotary proportional solenoid 26, a low hysteresis error can be achieved as compared to that which would be achieved with a variable DC supply. As the hysteresis envelope size is attributed to residual magnetism in the coil and armature poles and to friction in the bearing system of the solenoid, the pulse width modulation electrical signal and its attendant dither help to reduce the hysteresis effect. Pulse width modulator 34 continually switches the solenoid supply voltage on and off to vary the average coil current by changing the on-off ratio of the pulse period. During the on time, coil current rises as a function of coil resistance and inductance and during the off time the magnetic field begins to decay which reverses the solenoid voltage, forward biases diode 78, and generates a circulating current through the coil and diode to maintain a torque on the armature. The frequency of the pulse width modulation pulses produces a microscopic dither on the armature shaft to reduce static bearing friction. Depending upon the solenoid response characteristics, the frequency is adjusted high enough to prevent noticeable chatter, but not so high as to negate the improvement in armature hysteresis. Pulse width modulation control is also electrically efficient in that minimal power losses are produced in the driver transistor which is either in full conduction (saturated) or off, as contrasted with an analog driver which would exhibit significant $E \times I$ heating losses.

In the operation of the invention throttle control system, potentiometer 22 functions to provide a continuous electrical signal which is proportional to the instantaneous angular position of the accelerator pedal 10; potentiometer 20 functions to provide a continuous electrical signal which is proportional to the instantaneous angular position of the throttle valve 16; control system 24 functions to generate an output signal which is a composite of a throttle valve position signal, an error signal representing the difference between the throttle valve position signal and the accelerator pedal position signal, and a differential signal representing the differential with respect to time of the error signal; and solenoid 26 functions to positively and precisely position throttle valve 16 in response to the control signal received from control means 24.

It will be seen that a coil spring 84 is provided in association with pivot shaft end portion 18*a*. Coil spring 84, in known manner, is anchored at one end to the throttle body and at its other end to pivot shaft 18 so as to provide a resistance to the rotational movement of the pivot shaft. Spring 84 provides a fail-safe device which functions to close the throttle valve in the event of a failure of the control system and to further provide a force which acts as a counterbalance to the magnetic force generated in the magnetic field of solenoid 26 so that the throttle valve 16 is at all times disposed at an angular position that represents a balance between the force of the spring 84 and the force of the magnetic field of the solenoid 26. Spring 84 also functions to return throttle valve 16 to a fully closed position when the invention control system is shut off. Note that it is important that the summer 32 receive not only the error signal A-D and the differential signal $$\frac{d(A-D)}{dt},$$

but also the signal A since, under steady state conditions when the throttle valve 16 has achieved and is maintaining the position called for by accelerator 10, the error signal and differential signal both go to zero and yet it is important that a signal be constantly supplied to solenoid 26 to hold against the force of spring 84. This constant signal is provided by the signal A which is always present even when the error signal and the differential signal go to zero.

The invention throttle control system will be seen to provide many important advantages as compared to the prior art throttle control systems. Since the invention system incorporates the rate of change of the error signal, the invention system follows the input voltage from the throttle pedal sensor at an extremely fast response rate and without oscillation as the throttle pedal signal approaches a steady state value. Elimination of these oscillations in turn minimizes shock load damage and wear to the transmission and other drivetrain components. More specifically, the initial condition of the throttle valve as opposed to the initial position of the throttle pedal is represented by the signal A—D with A then approaching D over a finite period of time such that the quantity A—D and the quantity $$\frac{d(A - D)}{dt}$$

both approach zero as signals A and D finally coincide. With the function signal approaching zero over a finite period of time, the control system actually acts as a dampening system by progressively slowing the rate at which the throttle valve position approaches the equivalent position of the throttle pedal in a steady state condition. The invention further provides a throttle control system utilizing a rotational proportional solenoid as the actuator for the throttle valve so as to provide a very rapid response to the control signal.

Whereas preferred embodiments of the invention have been illustrated and described in detail, it will be apparent that various changes may be made in the disclosed embodiment without departing from the scope or spirit of the invention.

We claim:

1. A throttle control system for a motor vehicle of the type including an engine, a throttle body including a throttle valve, and an operator controlled accelerator member, said system including:
(A) throttle valve position sensing means operative to generate a first electrical signal representing the position of the throttle valve;
(B) accelerator position sensing means to generate a second electrical signal representing the position of the accelerator member;
(C) control means operative to generate a control signal reflecting the rate of change of the difference between said first and second signals; and
(D) actuator means receiving said control signal and operative to position the throttle valve in proportion to said control signal.

2. A throttle control system for a motor vehicle of the type including an engine, a throttle body including a throttle valve, means biasing the throttle valve toward an idle position, and an operator controlled accelerator member, said system comprising:
(A) throttle valve position sensing means operative to generate a first electrical signal representing the position of the throttle valve;
(B) accelerator position sensing means operative to generate a second electrical signal representing the position of the accelerator member;
(C) control means operative to generate a control signal including a first component representing said first electrical signal, a second component representing the difference between said first and second electrical signals and a third component representing the rate of change of the difference between said first and second desired signals; and
(D) a proportional solenoid receiving said control signal and operative to position the throttle valve in proportion to said control signal.

3. A throttle control system for a motor vehicle of the type including an engine and a throttle body mounted on the engine, and an operator controlled accelerator member, said system including:
(A) a throttle valve mounted for pivotal movement in the throttle body and having a pivot shaft;
(B) a rotary potentiometer drivingly connected to one end of said shaft and operative to generate a first electrical signal representing the position of said throttle valve;
(C) a rotary proportional solenoid drivingly connected to the other end of said shaft;
(D) accelerator position sensing means operative to generate a second electrical signal representing the position of the accelerator member; and
(E) control means operative to generate a control signal reflecting the difference between said first and second signals for delivery to said rotary proportional solenoid.

4. A throttle control system for a motor vehicle of the type including an engine, a throttle body including a throttle valve, means biasing the throttle valve toward an idle position, and an operator controlled accelerator member, said stem including:
(A) throttle valve position sensing means operative to generate a first electrical signal representing the position of the throttle valve;
(B) accelerator position sensing means operative to generate a second electrical signal representing the position of the accelerator member;
(C) control means operative to generate a control signal including a first component representing said first electrical signal, a second component representing the difference between said first and second electrical signals, and a third component representing the rate of change of the difference between said first and second electrical signals; and
(D) actuator means receiving said control signal and operative to position the throttle valve in proportion to said control signal.

5. A control system according to claim 1 wherein:
(E) said control signal includes a first component representing the rate of change of the difference between said first and second signals and a second component representing the difference between said first and second signals.

6. A control system according to claim 5 wherein:
(F) said control signal includes a third component representing said first electrical signal.

7. The control system according to claim 4 wherein:
(E) said actuator means comprises a proportional solenoid.

8. A control system according to claim 7 wherein:
(F) said throttle valve position sensing means and said accelerator position sensing means each comprise a rotary potentiometer.

9. A control system according to claim 4 wherein:
(E) said control means includes a comparator receiving said first and second electrical signals and generating an error signal representing the difference between said first and second signals and a differential signal representing the rate of change of said error signal;
(F) said control means further includes a summer; and
(G) said summer receives said first signal, said error signal, and said differential signal and generates a control signal including said first, second and third components.

10. A control system according to claim 2 wherein
(E) said control means includes a comparator receiving said first and second electrical signals and generating an error signal representing the difference between said first and second signals and a differential receiving said error signal and generating a differential signal representing the rate of change of said error signal;

(F) said control means further includes a summer; and (G) said summer receives said first signal, said error signal, and said differential signal and generates a control signal having said first, second, and third components.

11. A control system according to claim 10 wherein:

(F) said control means further includes a summer; and (G) said summer receives said first signal, said error signal, and said differential signal and generates a control signal having a first component representing said first signal, a second component representing said error signal, and a third component representing said differential signal.

12. A control system according to claim 2 wherein:

(E) said throttle valve position sensing means and said accelerator position sensing means each comprise a rotary potentiometer; and (F) said actuator comprises a rotary proportional solenoid.

* * * * *

UNITED STATES PATENT AND TRADEMARK OFFICE
CERTIFICATE OF CORRECTION

PATENT NO. : 4,831,985

DATED : May 23, 1989

INVENTOR(S) : Mabee et al

It is certified that error appears in the above-identified patent and that said Letters Patent is hereby corrected as shown below:

On the face of the patent the Assignee of record is Automotive Products plc, Warwickshire, England.

Column 1, line 18, "must circuitously" should be --must be circuitously--.

Column 4, line 62, "weighing" should be --weighting--.

Signed and Sealed this

Thirteenth Day of February, 1990

*Attest:*

JEFFREY M. SAMUELS

*Attesting Officer* *Acting Commissioner of Patents and Trademarks*